United States Patent [19]
Morton

[11] Patent Number: 4,989,327
[45] Date of Patent: Feb. 5, 1991

[54] ADJUSTABLE SIDE DRAFT INDICATOR

[76] Inventor: John R. Morton, Rte. 2, Box 265, Glenwood, Minn. 56334

[21] Appl. No.: 120,382

[22] Filed: Nov. 13, 1987

[51] Int. Cl.⁵ .............................................. G01C 9/10
[52] U.S. Cl. ........................................ 33/365; 33/384; 33/264
[58] Field of Search ................ 33/365, 380, 384, 385, 33/386, 388, 370

[56] References Cited

U.S. PATENT DOCUMENTS

| | | |
|---|---|---|
| 1,955,488 | 4/1934 | Crane et al. |
| 2,010,191 | 8/1935 | Koch et al. |
| 2,353,586 | 7/1944 | Reininger |
| 2,357,817 | 9/1944 | Foster ............................ 33/365 X |
| 2,555,954 | 6/1951 | Bruflat ........................... 33/264 |
| 2,677,193 | 5/1954 | Truppe |
| 3,522,658 | 8/1970 | Howell ............................ 33/528 |
| 3,548,508 | 12/1970 | Jacobsen ........................ 33/365 |
| 4,363,174 | 12/1982 | Curtis |

FOREIGN PATENT DOCUMENTS 1,174,836 11/1958 France ............................. 33/384

Primary Examiner—Harry N. Haroian
Attorney, Agent, or Firm—Fleit, Jacobson, Cohn, Price, Homan & Stern

[57] ABSTRACT

A transparent shape retentive and flexibly resilient tubular member is supported from a farm tractor in an upstanding plane disposed transverse to the tractor and is vertically bowed. The interior of the tubular member includes gravity responsive indicator structure disposed therein and movable therealong to a longitudinal center position within said tubular member responsive to gravity forces when the vehicle is laterally horizontally disposed and movable, proportionally along the tubular member from a central position therein toward opposite ends of the tublar member responsive to lateral tilting of the tractor in opposite directions and structure is provided to adjustably vary the radius of curvature of the arcuate tubular member.

11 Claims, 1 Drawing Sheet

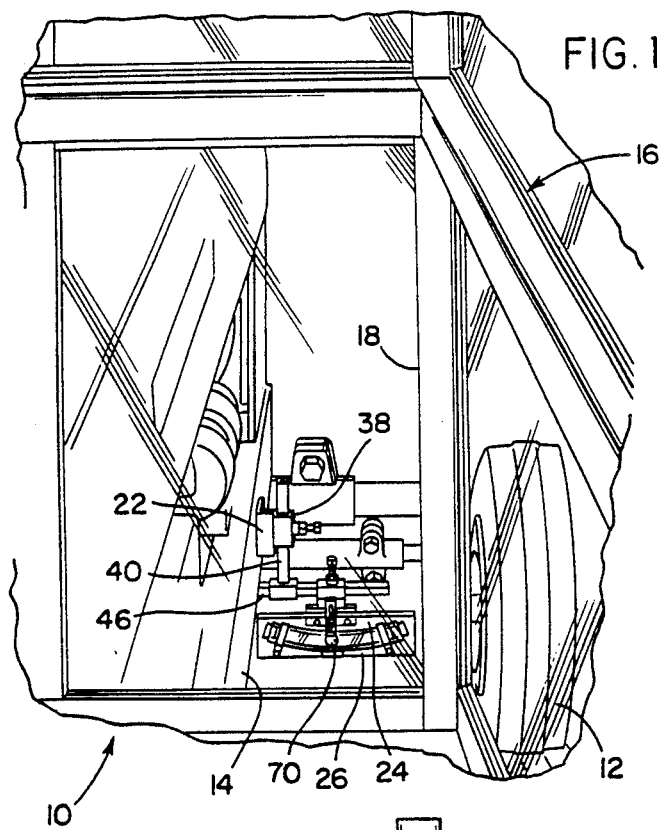
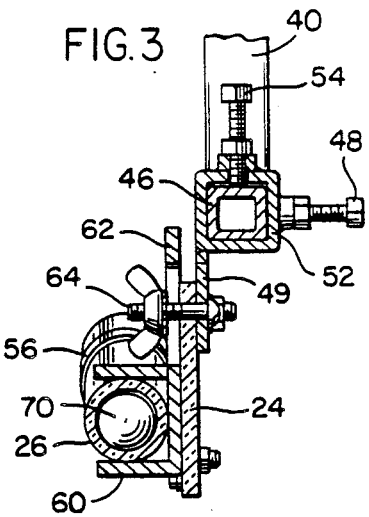
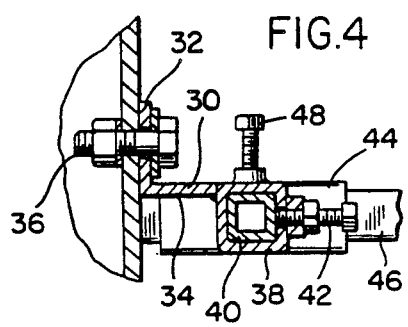
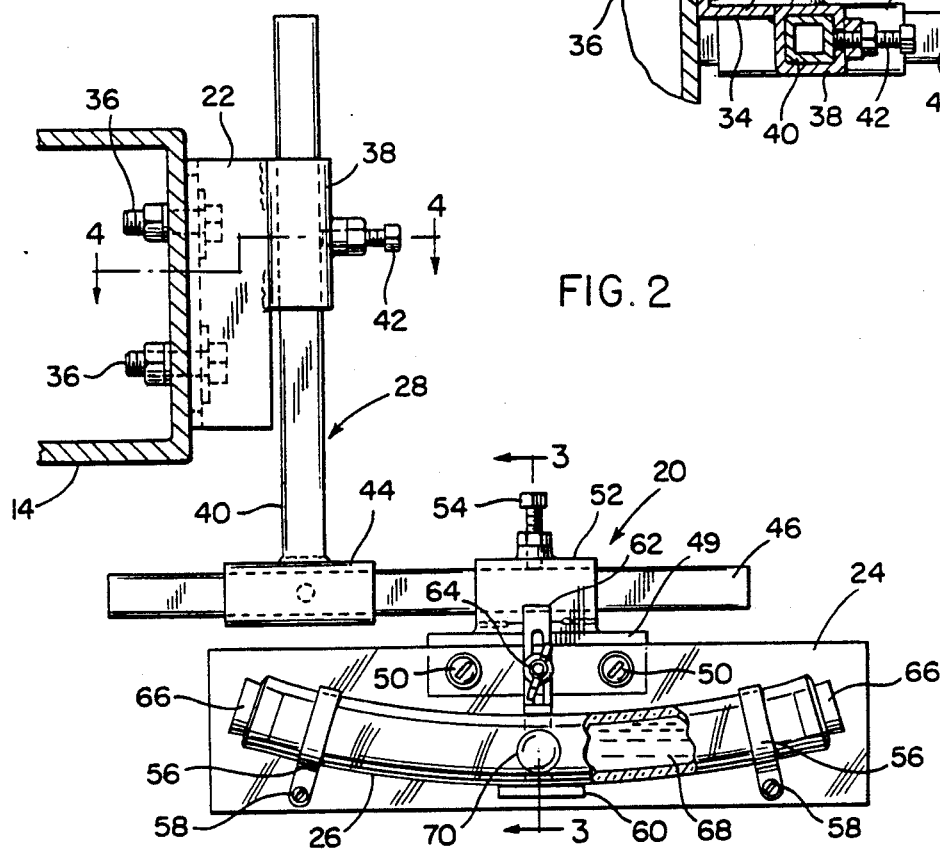

ADJUSTABLE SIDE DRAFT INDICATOR

BACKGROUND OF THE INVENTION

1. Field of the Invention

This invention relates to a gravity actuated indicator to assist the operator (driver) of a farm tractor pulling a cultivator implement therebehind in maintaining proper steerage of the tractor across a slope (even though the incline thereof may vary) in order to maintain the ground engaging portions of the cultivator implement properly centered between adjacent rows of crops.

2. Description of Related Art

Various different forms of indicators designed to accomplish the same and different functions and which utilize some of the general structural and operational features of the instant invention are disclosed in U.S. Pat. Nos. 1,955,488, 2,010,191, 2,353,586, 2,555,954, 2,677,193 and 4,363,174.

However, these previously known indicators do not include structure whereby different degrees of side draft by different types of tractor drawn implements may be readily compensated for.

SUMMARY OF THE INVENTION

The indicator of the instant invention, in the preferred disclosed form thereof, is generally similar to the gravity actuated indicators disclosed in U.S. Pat. Nos. 1,955,488, 2,010,191 and 2,353,586 in that a downwardly bowed tubular member encloses a ball member therein movable along the tubular member to the lowest point thereof responsive to angular displacement of the tubular member about a horizontal axis normal to an upstanding plane containing the tubular member.

However, the indicator of the instant invention differs from conventional indicators of this type in that the downwardly bowed tubular member in which an associated ball is disposed is constructed of shape retentive but flexibly resilient material and means is provided whereby the radius of curvature of the arcuate tubular member may be varied. By this type of construction, the indicator may be used to advantage on a farm tractor or other prime mover which may traverse a slope while pulling a given ground cultivating implement. The position of the ball within the tubular member is noted by a forward facing operator of the tractor as aligned with a crop row along which the tractor is being moved and corrective steering by the operator of the tractor may be effected to assure that the ground engaging portions of the cultivator draft implement are maintained to substantially centered between adjacent rows of crops.

Although the preferred form of the invention incorporates the aforementioned arcuate flexible tubular member having a gravity ball rollably received therein, it is also contemplated that an upwardly bowed flexible tubular member indicator also could be used in conjunction with a volume of fluid held captive within the tubular member slightly less than the internal volume of the tubular member in order to provide a gas bubble within the tube. This type of "inclinometer" also may be used to fully carry out the intended function of the instant invention, as long as structure is maintained for adjustably varying the radius of curvature of the tubular member.

The main object of this invention is to provide an improved form of side draft indicator for use on a farm draft vehicle.

Another object of this invention is to provide a side draft indicator incorporating an adjustability feature which may be adjusted according to varying draft forces required for a selected farm implement.

Yet another object of this invention is to provide an indicator which also may be adjusted according to varying slope angles to be traversed and drag varying adjustments to the associated cultivator.

Another object of this invention is to provide a side draft indicator in accordance with the preceding objects and including novel mounting structure whereby the indicator may be conveniently mounted from substantially any form of farm tractor or other prime mover.

A final object of this invention to be specifically enumerated herein is to provide a side draft indicator in accordance with the preceding objects and which will conform to the conventional forms of manufacture, be of simple construction and easy to use so as to provide a device that will be economically feasible, longlasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 1 is a fragmentary perspective view of those portions of a conventional form of farm tractor which may be viewed by the operator of the tractor as the latter is being moved forwardly along between crop rows and with the indicator of the instant invention operatively mounted from the tractor in position for ready viewing by the tractor operator;

FIG. 2 is an enlarged fragmentary vertical sectional view illustrating the indicator and its mounting structure as well as the manner in which the mounting structure may be operatively mounted from the tractor side frame rail;

FIG. 3 is an enlarged fragmentary vertical sectional view taken substantially upon the plane indicated by the section line 3—3 of FIG. 2; and FIG. 4 is a fragmentary vertical sectional view taken substantially upon the plane indicated by the section line 4—4 of FIG. 2.

DETAILED DESCRIPTION OF THE PREFERRED EMBODIMENT

Referring now more specifically to the drawings, the numeral 10 generally designates a conventional form of farm tractor. The tractor 10 includes opposite side dirigible front wheels 12 (only one of which is illustrated) and opposite side lower forward frame rails 14 (only one of which is illustrated).

The tractor 10 includes a partial cab enclosure referred to in general by the reference numeral 16 including a forward facing viewing window opening 18 providing a forward and downward directional view of the ground immediately inboard of the right side front wheel 12 by the operator of the tractor 10.

The side draft indicator of the instant invention is referred to in general by the reference numeral 20 and includes a mount 22 for semi-permanent attachment to the frame rail 14. The indicator 20 further includes an edge upstanding panel-like support structure 24 from which a downwardly bowed transparent tubular member 26 is supported in a manner hereinafter to be more fully set forth and mounting structure referred to in general by the reference numeral 28 is provided for adjustably supporting the support structure 24 from the mount 22.

The mount 22 incorporates an angle member 30 including right angularly disposed vertical flanges 32 and 34. A pair of fasteners 36 are secured through the flange 32 and the frame rail 14. In addition, an upstanding square tube member 38 is secured by welding to the flange 34 and the mounting structure 28 includes an upstanding tubular shank 40 which is square in external cross section and slidably received through the tube member 38, the latter including a set screw 42 supported therefrom for retaining the tubular shank 40 in adjusted vertical position relative to the tube member 38. The lower end of the tubular shank 40 includes a short horizontal tube member 44 supported therefrom and one end of a horizontal tubular shank 46 is slidably received through the tube member 44, the latter also including a set screw 48 supported therefrom for retaining the tubular shank 46 in adjusted longitudinally shifted position relative to the tube member 44.

The support structure 24 is mounted upon a mounting plate portion 48 through the utilization of suitable fasteners 50 and the mounting plate portion 49 carries a tube member 52 slidably disposed on the end of the tubular shank 46 remote from the end thereof received through the tube member 44 and the tube member 52 includes a set screw 54 operably engageable with the tubular shank 46 in order to retain the tube member 52 in adjusted shifted position along the tubular shank 46.

The flexible tubular member 26 is transparent, as is the support structure 24, and the opposite ends of the tubular member 26 are mounted from the support structure 24 through the utilization of clamps 56 encircling the opposite ends of the tubular member 26 and mounted from the support structure 24 by fasteners 58 about which the clamps 56 may swing relative to the support structure 24.

In addition, a channel member 60 which embracingly engages the longitudinal center portion of tubular member 26 is mounted from the support structure 24 through the utilization of a vertically slotted mounting bracket 62 and a threaded fastener 64 secured through the support structure 24 and the slotted bracket 62. Accordingly, the channel member 60 may be adjusted in height relative to the support structure 24 in order to vary the radius of curvature of the arcuate tubular member 26.

The opposite ends of the tubular member 26 are closed in any convenient manner such as by removable plugs 66 and the interior of the tubular member 26 is substantially completely filled with a transparent liquid 68 having a low freezing point. Such liquid may include water having antifreeze mixed therewith in proper proportion or a clear oil. In addition, a spherical ball 70 of a diameter at least slightly less than the inside diameter of the tubular member 36 is disposed therein for rolling gravity movement along the tubular member to the lowest point thereof.

In operation, and assuming that the tractor 10 is to be operated on level ground and that the cultivating implements to be towed therebehind do not exert any side thrust on the rear of the tractor 10, the tubular member 26 may be adjusted along the tubular shank 46 to a position with the ball 70 disposed vertically over a crop row immediately inboard of the right front wheel 12 along which the tractor 10 is to be moved. The operator of the tractor may then view the crop row through the window 18 and steer the tractor 10 so that the ball 70 is maintained centrally over the crop row. This will ensure that the ground engaging portions of the cultivator implement being pulled by the tractor 10 will engage the ground centrally intermediate the crop rows, the cultivator implement having been previously adjusted according to the crop row spacing.

If, however, the tractor 10 begins to traverse a slope while pulling the cultivator implement and the right side of the tractor 10 is on the downhill side of the slope, the support structure 24 will be inclined relative to the horizontal with its right end lowermost and the ball 70 will move from the longitudinal center of the tubular member 26 toward the lowermost end of the tubular member 26. If the operator of the tractor still maintains the ball 70 in vertical alignment with the crop row immediately inboard of the right front tractor wheel 12, the tractor 10 actually will be steered slightly toward the left relative to that crop row. Although the drag on the tractor 10 by the cultivator implement and the slope of the ground being traversed tends to displace the rear of the tractor, and thus the attached cultivating implement, in a downhill direction, by maintaining the ball 70 in vertical alignment with the crop row immediately inboard of the right front wheel 12 the tractor 10 will be steered slightly to the left and the ground engaging portions of the cultivating implement will be maintained centrally between the crop rows.

Although the indicator 20 is capable of compensating for varying angles of slope being traversed, different cultivating implements and siol conditions can increase or decrease the amount of drag the cultivating implement places upon the tractor 10 and consequently the lateral thrust exerted on the rear of the tractor 10 by the cultivating implement. Accordingly, if the implement or soil conditions increase the drag on the tractor 10 the channel member 60 may be upwardly adjusted thereby reducing the radius of curvature of the tubular member 26 and increasing the distance the ball 70 will roll toward the end of the tubular member 26 from a centered position therein as a result of the tractor 10 traversing a slope. Accordingly, the operator of the tractor may then steer more to the left as determined by the position of the ball 70 in the tubular member 26 when the right side of the tractor 10 is on the downhill side of the slope in order to compensate for the increased lateral thrust applied to the rear end of the tractor 10 by the cultivator implement. Of course, if a specific implement or ground conditions reduce the amount of drag of the implement on the tractor 10, the radius of curvature of the tubular member 26 may be decreased by downward adjustment of the channel member 60 relative to the support structure 24.

As hereinbefore set forth, as an alternate to the construction illustrated in FIGS. 2 and 3, the support structure could be inverted, as well as the tubular member 26, and a gas bubble could be used in lieu of the ball 70. A modified construction of this type would operate in substantially the same manner as that form of the invention illustrated in FIGS. 2 and 3.

The mounting structure tubular shank 40 may of course be vertically adjusted in accordance with row crop height and the vertical clearance between the row crop and the frame member 14. Also, the tubular shank 40 may be inverted so as to position the tube member 40 above the mount 22 and the tube member 52 would then be inverted relative to the tubular shank 46, the plane of the support structure 24 being laterally spaced relative to the tubular shank 40 and tube member 44.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. In combination with a draft vehicle subject to varying crop row cultivator equipment drag forces while traversing a slope, an adjustable side draft indicator, said indicator including a mount stationarily supported from said vehicle, support structure, mounting means mounting said support structure from said mount, a shape retentive and flexibly resilient elongated, arcuate transparent tubular member mounted from said support structure with said tubular member generally horizontally disposed and at least substantially disposed in an upstanding plane extending transversely of said vehicle, gravity responsive indicator means disposed in said tubular member and movable therein along the length thereof toward a central position within said tubular member responsive to gravity forces when said vehicle is laterally horizontally disposed and movable, proportionally along said tubular member from said central position toward opposite ends of said tubular member, responsive to lateral tilting of said support member in opposite directions about a horizontal axis extending longitudinally of said vehicle, and means operative to adjustably vary the radius of curvature of said arcuate tubular member.

2. The draft vehicle and indicator combination of claim 1 wherein said tubular member is downwardly bowed and said gravity responsive indicator means includes a ball member rollingly disposed within said tubular member.

3. The combination of claim 2 wherein said tubular member is substantially filled with a movement dampening liquid through which said ball may roll.

4. The draft vehicle and indicator combination of claim 1 wherein said support structure includes means for adjusting the height of said tubular member.

5. The vehicle and indicator combination of claim 1 wherein said support structure includes means for adjusting the positioning of said tubular member laterally of said vehicle.

6. The combination of claim 5 wherein said support structure also includes means for adjusting the height of said tubular member relative to said vehicle.

7. The combination of claim 6 wherein said tubular member is downwardly bowed and said gravity responsive indicator means includes a ball member rollingly disposed within said tubular member.

8. The combinations of claim 7 wherein said tubular member is substantially filled with a movement dampening liquid through which said ball may roll.

9. The vehicle and indicator combination of claim 1 wherein said tubular member is mounted from said support structure through the utilization of mounting means supportively engaging the opposite end portions of said tubular member from said support structure and oscillatably mounted from said support structure for angular displacement about generally parallel horizontal axes disposed transverse to said tubular member.

10. The combination of claim 9 wherein said axes are spaced below the opposite ends of said tubular member.

11. The combination of claim 10 wherein said means operative to adjustably vary the radius of curvature of said tubular member includes means operatively supportingly engaged with the longitudinal mid-portion of said tubular member and mounted for vertical adjustment relative to said axes.

* * * * *